Oct. 1, 1963
J. H. HOLLYDAY
3,105,602
AGRICULTURAL IMPLEMENT
Filed Feb. 26, 1962
3 Sheets-Sheet 1
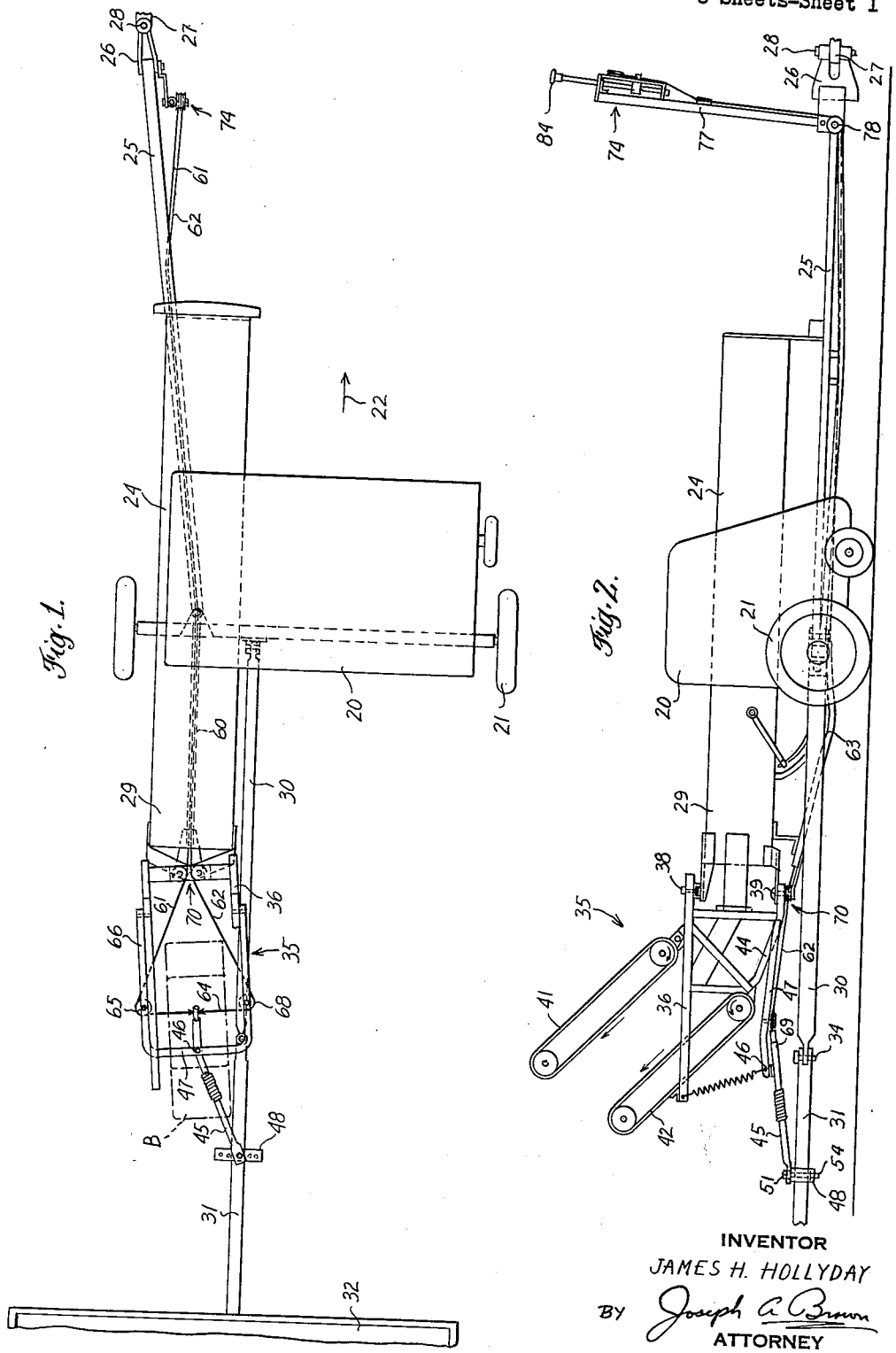
INVENTOR
JAMES H. HOLLYDAY
BY Joseph A. Brown
ATTORNEY

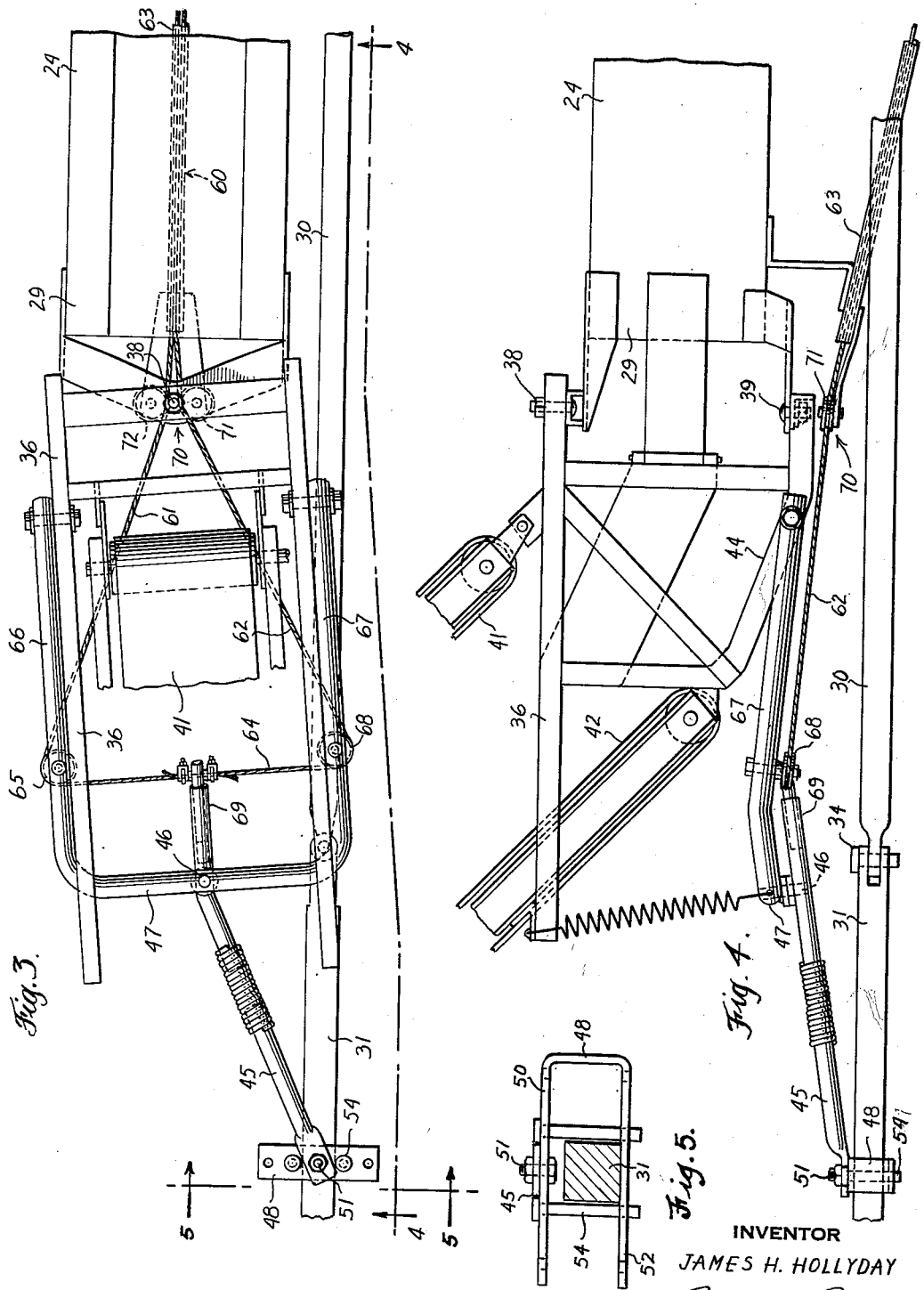

Oct. 1, 1963  J. H. HOLLYDAY  3,105,602
AGRICULTURAL IMPLEMENT
Filed Feb. 26, 1962  3 Sheets-Sheet 3
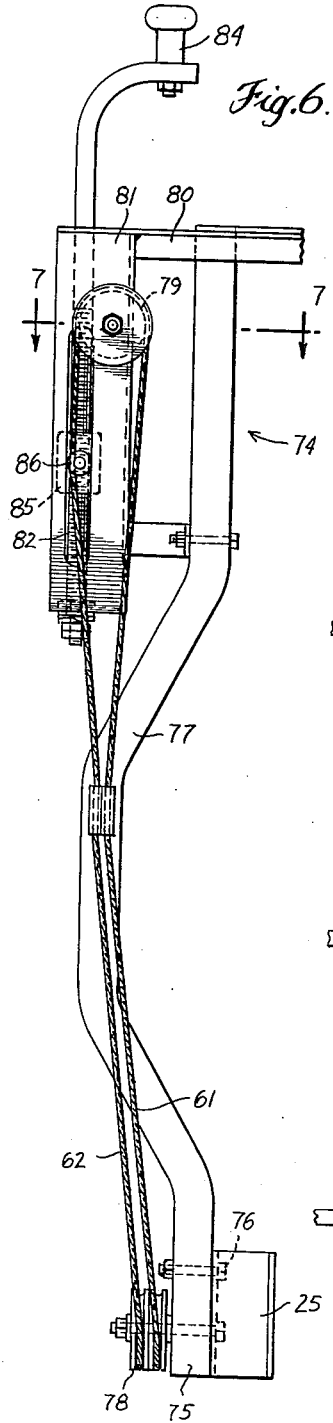
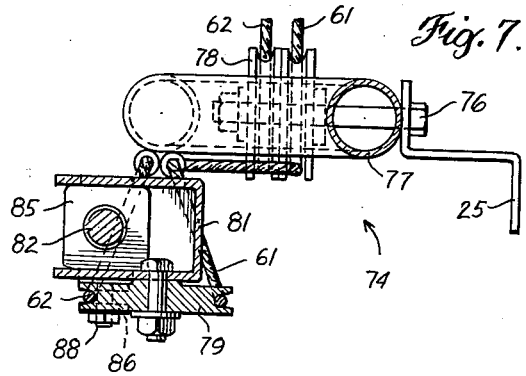
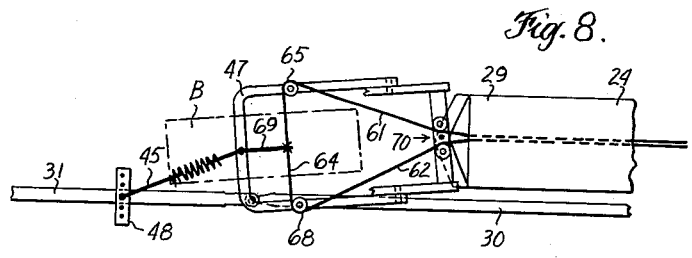
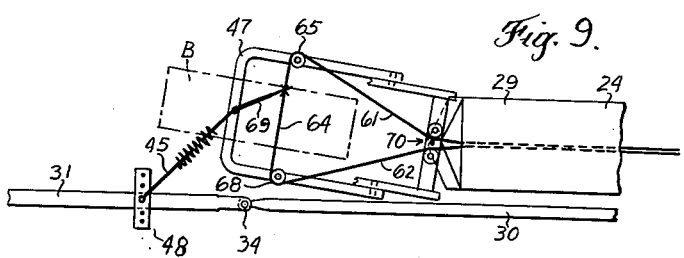
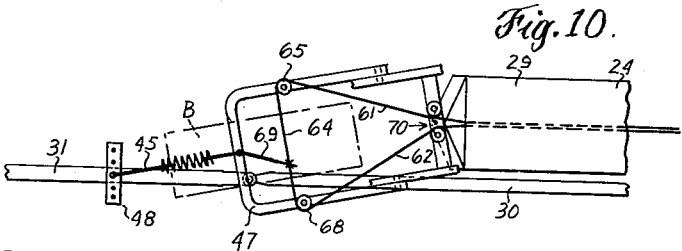
INVENTOR
JAMES H. HOLLYDAY
BY Joseph A. Brown
ATTORNEY

United States Patent Office 3,105,602
Patented Oct. 1, 1963

3,105,602
AGRICULTURAL IMPLEMENT
James H. Hollyday, New Holland, Pa., assignor to Sperry Rand Corporation, New Holland, Pa., a corporation of Delaware
Filed Feb. 26, 1962, Ser. No. 175,575
10 Claims. (Cl. 214—42)

This invention relates to bale throwers adapted to be mounted on the bale cases of hay balers to receive bales therefrom and to traject the bales into trailing wagons.

At the present time, a bale thrower is being manufactured and sold which is mountable on a hay baler and comprises a pair of cooperative endless belts which engage the top and bottom respectively of a discharged bale to traject the bale into a wagon trailing behind the baler. The belts are mounted one above the other and are carried on a frame adapted to be pivotally mounted on the discharge end of the baler bale case for lateral swinging movement relative thereto so that the direction in which a given bale is thrown can be regulated. The cooperative endless belts operate continuously, being spaced rearwardly from the bale case of the baler a distance substantially equal to the length of discharged bales so that each bale upon discharge is substantially free of the baler before engagement with the belts. A gasoline engine is provided for driving the belts and the speed of the engine is variable whereby the distance a bale is thrown can be varied. The frame on which the endless belts are carried is connected to the tongue of the trailing wagon by a link arm which causes the thrower frame to be swung laterally about its pivotal connection with the bale case of the baler responsive to changes in direction of travel of the baler and resulting angular displacement of the baler and wagon. This insures that the trajectory of thrown bales will terminate in the wagon regardless of the position of the baler relative to the wagon.

When the baler is operating on flat terrain and traveling straight ahead, the bale thrower is laterally positioned to traject the bales to a location in the wagon about midway between the two side walls. When a turn is being made, the thrower will be swung laterally and steered so that it will continue to throw toward the wagon and between the side walls.

Some difficulty has been experienced when the baler, thrower and wagon are operated on a hillside, and in a transverse direction relative to the slope of the hill. Under such a condition, a thrown bale travels in a trajectory which falls off in a downhill direction. The force of gravity directs the bale toward one side of the wagon. Depending on the steepness of the hill, the bale may completely pass over that side and miss being deposited in the wagon. This problem may not be properly overcome by positioning the thrower to take into account the hillside operation because on one side of a hill the baler and wagon will be tilted in one direction and on the opposite side of the hill the baler and wagon will be tilted in the opposite direction. Moreover, in many areas the particular terrain over which the baler is being operated may vary from one end of a field to another and there are no uniform operating conditions.

Further, when a wagon is being loaded with bales and the load is almost completed, it sometimes happens that a given corner of the wagon box may be partially empty while the remainder of the wagon is full. It would be desirable therefore to be able to throw bales to the low corner and thereby achieve a greater load. With present equipment, such loading is not possible. The operator can evenly distribute the load in the wagon in a fore-and-aft direction, but lateral distribution depends upon random tumbling of the bales as they are deposited.

One object of this invention is to provide, in combination with a bale thrower of the character described, means for controlling the lateral position of the thrower whereby bales can be thrown from a baler into a trailing wagon regardless of whether the baler is being operated on level terrain, on a hillside, or in any other environment and a trajected bale will land in a desired position in the wagon.

Another object of this invention is to provide, in combination with a bale thrower of the character described, means whereby the neutral lateral position of the thrower can be selectively established to take into account the particular terrain over which the baler is being operated and without interferring with the normal steerability of the thrower responsive to changes in the direction of travel of the baler.

Another object of this invention is to provide bale thrower control means of the character described through which the direction in which bales are thrown can be manually varied to compensate for unusual operating terrain conditions.

A further object of this invention is to provide bale thrower control means of the character described whereby a better and more uniform load of bales can be provided in a wagon without the operator having to leave his position on the tractor towing the baler.

A still further object of this invention is to provide bale thrower position control means whereby changes in the terrain over which the baler is being operated can be compensated for without stopping the baling operation, a bale trajectory terminating in the wagon regardless of the particular environment in which the baler is being operated.

A still further object of this invention is to provide bale thrower control means which is relatively simple and inexpensive to manufacture and use with present bale thrower equipment.

Other objects of this invention will be apparent hereinafter from the specification and from the recital in the appended claims.

In the drawings:

FIG. 1 is a generally diagrammatic plan view showing a hay baler, the forward end of a wagon trailing behind the baler and a bale thrower mounted on the bale case of the baler to receive bales therefrom and traject them to the wagon, the operative position of the thrower being controlled by control means constructed according to this invention;

FIG. 2 is a side elevation of FIG. 1;

FIG. 3 is an enlarged fragmentary plan view of the bale thrower and showing connected thereto the control means of this invention;

FIG. 4 is a side elevation of FIG. 3, taken on the line 4—4 and looking in the direction of the arrows;

FIG. 5 is an enlarged section taken on the line 5—5 of FIG. 3 looking in the direction of the arrows and showing the connection of the bale thrower steering link and the wagon tongue;

FIG. 6 is an enlarged view of the stand of the control means and located at the front end of the baler;

FIG. 7 is a section taken on the line 7—7 of FIG. 6 looking in the direction of the arrows; and FIGS. 8, 9 and 10 are generally diagrammatic plan views showing the bale thrower in three different positions of adjustment as a result of adjustment of the control means.

Referring now to the drawings by numerals of reference, and particularly FIGS. 1 and 2, 20 denotes a hay baler supported on wheels 21 for travel in a forward direction indicated by the arrow 22 in FIG. 1. The baler has a bale case 24 which extends in a fore-and-aft direction relative to ground travel and along one side of the baler. A tongue 25 extends forwardly of the bale case and it is provided with a clevis 26 for connection to the drawbar 27 of a tractor, not shown, by means of a hitch pin 28. The baler is adapted to be towed along a windrow of hay, which is picked up by a conventional mechanism and fed into the bale case 24. As the bales are formed they are moved toward a rear end 29 of the bale case for discharge. The pickup and infeed mechanism of the baler may be similar to that shown in U.S. Patent No. 2,950,670.

The baler 20 has a rearwardly extended drawbar 30 to which the tongue 31 of a wagon 32 is connected. A vertical pin 34 provides a pivotal connection between the tongue and the baler drawbar so that they are free to pivot relative to each other responsive to changes in direction of travel of the baler. The wagon 32 is towed behind the baler to receive the completed bales. For trajecting completed bales from the baler and into the wagon, a bale thrower 35 is provided.

Thrower 35 comprises a frame structure 36 mounted on the discharge end 29 of the bale case 24. The mounting structure includes vertically aligned pivots 38 and 39 which permits frame 36 to swing laterally relative to the bale case whereby the direction in which bales are thrown can be varied. The frame 36 carries trajecting means in the form of a pair of cooperative endless belts 41 and 42 which are spaced apart a distance substantially equal to the vertical thickness of discharged bales. As shown in FIG. 2, the belts extend upwardly and rearwardly. They are spaced rearwardly from the rear end 29 of the baler bale case 24 such a distance that each bale to be thrown is substantially clear of the bale case 24 before engagement with the belts. The belts travel as indicated by the arrows and at high speed. A conventional gasoline engine, not shown, or other means is provided on the frame 36 to drive the belts 41 and 42. As each bale is discharged, it slides across a bottom guide plate 44 extending from the trajecting belts to the rear end 29 of the bale case. As each bale emerges, it travels toward the lower belt 42 and beneath the upper belt 41. On engagement with the lower belt, the bale is lifted into engagement with the upper belt 41, whereupon bolt belts traveling at high speed cooperate to speed up the bale rearward travel and to traject the bale into the wagon 32.

In order to control the position of bale thrower 35 so that the bales will be thrown toward wagon 32 even though the baler 20 is making a turn, a generally fore-and-aft extending steering link arm 45 is provided and pivotally connected between its ends at 46 to a pivoted portion 47 of thrower frame 36. At its rearward end, link 45 is connected by a U-shaped bracket 48 to the wagon tongue 31. As shown best in FIG. 5, the connection between link arm 45 and wagon tongue 31 is slidable in a longitudinal direction relative to the tongue. The U-shaped bracket 48 straddles the tongue 31 having a top arm 50 to which the link arm is connected by a bolt-nut means 51. The lower arm 52 of the bracket 48 extends beneath tongue 31 and pins 54 are provided which extend on opposite sides of the tongue as shown. Thus, the connection of the link arm with the tongue 31 is such that the bracket 48 may slide in a fore-and-aft direction relative to the tongue.

When the baler is operating on level terrain and traveling straight ahead, the baler 20 and wagon 32 are disposed approximately as shown in plan view in FIG. 1. Since the bale case 24 is along one lateral side of the baler, the bale thrower 35 is normally angled slightly inwardly so that trajected bales will land substantially in the middle of the wagon between the side walls thereof. To compensate for variations in bale trajectory which result when the baler is operated on a hillside, control means is provided whereby the neutral position of the thrower 35 can be selectively established. The control means comprises an endless flexible cable 60 having coextensive reaches which form a first member 61 and a second member 62 shown best in FIGS. 3 and 4. These members of the cable are interconnected by a section 64 which extends transversely to the longitudinal axis of the thrower 35. Cable member 61 extends around a guide pulley 65 fastened to leg 66 of portion 47 of the thrower frame 36 and along one side of the thrower. The cable member 62 extends around a guide pulley 68 connected to leg 67 of frame portion 47 along the opposite side of the thrower. The section 64 of the cable is fastened to the forward end of link arm 45, as shown, whereby both cable members are connected to the link arm. Between pivot 46 and the connection to cable section 64, link arm 45 has a telescopic section 69 whereby the link may be elongated responsive to shifting of the control cable.

The cable members 61 and 62 extend forwardly from the pulleys 65 and 68, respectively, and converge toward each other. At 70 they pass between guide rollers 71 and 72. The location 70 is approximately in alignment with the vertical axis of pivots 38 and 39 of the connection between thrower frame 36 and bale case 24. From the location 70 the cable members 61 and 62 extend forwardly through a tube 63 and then along the drawbar 25 to a control stand 74, FIGS. 6 and 7. The stand 74 is mounted on the forward end of tongue 25 and extends upwardly. It comprises a section of pipe 77 having a lower end 75 connected to the tongue 25 by bolts 76. A pair of pulleys 78 are rotatably mounted at the lower end of the stand and around which the cable members 61 and 62 pass. The cable members extend upwardly along pipe 77 and to a guide pulley 79 adjacent the top portion 80 of the stand. The pulley 79 is rotatably mounted on a U-shaped bracket 81 through which a threaded rod 82 extends. The rod has a handle 84 at its upper end whereby the screw may be rotated. The screw 82 is threaded through a block 85 which is vertically slidable between the side walls of bracket 81. When handle 84 is turned in one direction, the block 85 is lifted and when the handle is turned in the opposite direction block 85 is lowered. Such block has a clamp member 86 connected by bolt 88 to the cable member 62. Thus, as the block 85 is adjusted up or down, the cable 62 is correspondingly adjusted and since the cable members 61 and 62 comprise reaches of the same endless cable 60, both cable members are shifted responsive to any adjustment of block 85.

Under normal baling conditions, wherein the terrain over which the baler is operated is relatively level, the bale thrower 35 is positioned as shown diagrammatically in FIG. 8. The cable members 61 and 62 are located so that the connection with the link arm 45 is approximately midway between the lateral sides of the bale thrower. When a bale B emerges from the bale case 24 it passes between belts 41 and 42 and is trajected thereby toward the wagon 32 and midway between the wagon side walls. If the baler is being operated on a hillside sloping downwardly toward the right relative to the direction of the travel of the baler, the normal or neutral operating position of the thrower is shifted to compensate for this hillside operation. To achieve this, the handle 84 is rotated in such direction that the cable member 61 is pulled. This shifts link 45 toward guide pulley 65 as shown in FIG. 9 and the telescopic section 69 is elongated. The thrower is now aiming toward the left hand wall of the wagon 32. However, due to the angular disposition of the baler and the wagon traveling along the hillside, a trajected bale will land approximately in the center of the wagon.

When the baler and wagon are operated on a hillside sloping toward the left relative to the direction of travel, the handle 84 will be cranked by the baler operator in the opposite direction to pull cable member 62 and shift the connection with the link arm 45 toward the guide pulley 68 and pivot the thrower to the position shown in FIG. 10. As the thrower is swung, telescopic connection 69 first shortens then lengthens. A thrown bale is directed toward the right hand wall of the wagon 32 but due to the slope of the hill, the trajectory terminates approximately in the center of the wagon because of the force of gravity.

Thus, the operating position of the bale thrower can be set in a normal neutral position such as shown in FIG. 8 when the baler is operating on level ground, or swung to the left as shown in FIG. 9 when the baler is operating on a hill sloping toward the right, and swung to the right as shown in FIG. 10 when the baler is operating on a hill sloping towards the left relative to the direction of travel. Such hillside control selectively establishes the normal or neutral operating position of the bale thrower. It does not interfere with the steerability of the thrower responsive to changes in the direction of travel of the baler and controlled by the link arm 45. Thus, the hillside control means of this invention provides a control within the reach of the operator whereby the neutral operating position of the bale thrower can be selectively established as desired to insure that a trajected bale will land in wagon 32 regardless of terrain over which the baler is operated.

Thrower 35 can be swung right or left very quickly using handle 84. Thus if an operator is baling on a hill sloping to his right, he can direct the thrower as shown in FIG. 9 and if he approaches a hill wherein the baler and wagon will be sloped to the left, he can quickly pivot the thrower to the position shown in FIG. 10. When once adjusted, the thrower will be steered as usual by the link 45.

If the baler operator notices that the load of bales building up in wagon 32 is not uniform, he can use the handle 84 to throw bales toward the particular area in the wagon where the load is low. Thus, in addition to hillside control, the operator can vary the direction of bale trajectory as desired and without leaving his position on the tractor. The end result is that bales trajected by the thrower 35 will not miss wagon 32, regardless of operating conditions, and a full, uniform load is easily achieved.

Although the control of the position of thrower 35 has been shown to be by means of endless cable 60, it will be clear that cables or the like which are not endless could be employed. Also, one cable and a return spring could be used cooperatively. Therefore, while this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention what I claim is:

1. A bale thrower mountable on the discharge end of the bale case of a hay baler to receive bales therefrom and traject them to a trailing wagon having a tongue pivotally connected to the baler comprising, in combination, a frame, bale trajecting means supported on said frame, means for mounting said frame on the bale case for lateral swinging movement relative thereto about a vertical axis and to each side of a neutral position, link means on said frame and slidably connectable to the wagon for swinging said frame from said neutral position responsive to changes in direction of travel of the baler and resulting angular displacement of the baler relative to the wagon, and control means to laterally swing said frame and selectively establish said neutral position while permitting lateral movement of the frame from the selected position, said control means comprising a first member connected to one side of said frame and to said link means, a second member connected to the opposite side of the frame and to said link means, and means for shifting said first member to swing said frame in one lateral direction and for shifting said second member to swing the frame in an opposite lateral direction whereby said neutral position may be selectively established to determine the direction bales will normally be trajected from the baler, both of said members extending from their connections to said frame to locations along said vertical axis whereby the control means does not materially interfere with swinging of said frame by said link means.

2. A bale thrower as recited in claim 1 wherein said first and second members comprise flexible members extending around guides on said frame and connected to each other whereby when one member is shifted the other member is simultaneously and correspondingly shifted.

3. A bale thrower as recited in claim 2 wherein said link means comprises a link arm one end of which is slidably connected to the wagon tongue and the opposite end of which is connected to said flexible members intermediate said guides, and said link arm being pivotally connected between its ends to said frame.

4. A bale thrower as recited in claim 3 wherein the end of said link arm adjacent said flexible members is telescopic whereby the link arm may be lengthened and shortened responsive to shifting of said flexible members.

5. A bale thrower as recited in claim 2 wherein said guides comprise rollers and said flexible members comprise cables.

6. A bale thrower as recited in claim 1 wherein said first and second members comprise reaches of the same endless cable whereby when one member is shifted the other member is correspondingly shifted.

7. A bale thrower as recited in claim 6 wherein said control means includes a stand mounted on the baler at a forward portion thereof within reach of an operator on a tractor towing the baler, and means connecting said endless cable to said stand for adjustment relative thereto to exert a pull on one or the other of said members.

8. A bale thrower as recited in claim 7 wherein the means connecting said cable to said stand is adjustable.

9. A bale thrower as recited in claim 7 wherein a single adjustment means is provided for adjusting both of said members of said cable.

10. A bale thrower mountable on the rearward discharge end of a fore-and-aft extending bale case of a hay baler to receive bales therefrom and traject them to a trailing wagon having a forwardly extending tongue pivotally connected to the baler comprising, in combination, a frame, bale trajecting means supported on said frame, means for mounting said frame on the bale case for lateral swinging movement relative thereto about a vertical axis and to each side of a neutral position, a link arm extending generally fore-and-aft and having a forward end and a rearward end, means connecting said link arm to said frame for pivotal movement about an axis extending in a vertical direction, means on said link arm rearward end providing a fore-and-aft slidable connection between the arm and said wagon tongue, movable control means interconnected between said link arm and said frame, means for moving said control means to laterally adjust said link arm relative to said frame whereby the link arm pivots about said pivotal connecting means and said neutral position of the frame is varied thereby, said frame being laterally swingable by said link arm responsive to changes in direction of travel of the baler and resulting angular displacement of the baler relative to the wagon, and said control means selectively establishing said neutral position without impairing lateral movement of the frame by said link arm.

References Cited in the file of this patent

UNITED STATES PATENTS

| | | |
|---|---|---|
| 261,778 | Sprague et al. | July 25, 1882 |
| 476,616 | Dodge | June 7, 1892 |
| 2,724,516 | Weishaar | Nov. 22, 1955 |
| 2,748,958 | Moser | June 5, 1956 |
| 2,785,811 | Forth | Mar. 19, 1957 |